United States Patent [19]
Edhlund

[11] 4,044,181
[45] Aug. 23, 1977

[54] DECALCOMANIA IMAGE TRANSFER SYSTEM

[76] Inventor: Ronald D. Edhlund, 418 N. Fairview, Mount Prospect, Ill. 60056

[21] Appl. No.: 579,371

[22] Filed: May 21, 1975

[51] Int. Cl.[2] .......................... B32B 3/10; B32B 7/06; B32B 27/24; B32B 27/38

[52] U.S. Cl. ...................................... 428/40; 40/2 R; 40/125 A; 101/114; 156/240; 156/277; 156/289; 156/330; 427/147; 427/152; 428/195; 428/337; 428/355; 428/914

[58] Field of Search ................ 428/40, 195, 337, 355, 428/914; 156/240, 277, 289, 330; 40/125 A, 125 E, 2 R, 135; 101/114; 427/147, 152

[56] References Cited

U.S. PATENT DOCUMENTS

| | | | |
|---|---|---|---|
| 2,618,333 | 11/1952 | Judd | 428/40 X |
| 3,411,935 | 11/1968 | Winzer | 428/337 X |
| 3,432,376 | 3/1969 | Reed et al. | 428/40 X |
| 3,454,458 | 7/1969 | Borregard | 428/40 |
| 3,533,899 | 10/1970 | Kapral | 428/40 |
| 3,565,750 | 2/1971 | Evans | 428/40 |
| 3,741,787 | 6/1973 | Tordjman | 428/337 X |
| 3,753,755 | 8/1973 | Olson | 428/40 |

OTHER PUBLICATIONS

Morton, Introduction to Rubber Technology, Reinhold Publishing Corp., New York, N.Y., 1959, pp. 130–131.

*Primary Examiner*—William A. Powell
*Assistant Examiner*—Thomas Bokan

[57] ABSTRACT

A decalcomania image transfer system comprises a non-stretchable base sheet of linear oriented high-impact styrene, with one or more images of flexible decal lacquer formed thereon. The lacquer is applied through a photo emulsion stencil. Subsequently, a pressure-sensitive adhesive is applied through another photo emulsion stencil and over the lacquer image. A very thin outside film of the adhesive dries and forms a surface oxide film, which precludes a sticky feel, but which will break when burnished, to enable the underlying adhesive to attach the image onto a receiving surface.

9 Claims, 9 Drawing Figures

DECALCOMANIA IMAGE TRANSFER SYSTEM

This invention relates to means for and a process of transferring images from a base sheet to a receiving surface and more particularly, to decalcomanias which do not require either a stretching of the base sheet or a solvent to transfer the images.

The term "image" is used herein to describe any letter, symbol, picture, graphic or similar material.

Image transferral methods have proven particularly useful wherever decoration of lettering is to be applied from a base or backing sheet to a receiving surface. These methods are particularly useful for low volume, or one of a kind, printing. Those engaging in advertising and publishing or in the production or development of prototype products or models find image transferral techniques particularly important for applying trademarks, corporate means, numbers, letters, or the like, to receiving surfaces. Of course, anyone else may also have a great need for fast and effective image transferral techniques.

One problem often encountered in transfer of type or printing is that the images do not stick uniformly to surfaces which have a texture, sharp curves, or the like. Another problem is that heretofore the backing sheet has been stretched to release the image, and that stretching sometimes tends to damage or distort the image.

Also, in the past, transfer sheets often employed either a water activated adhesive or a dry adhesive which was sensitive to pressure or heat. The water soluble adhesive sheets are messy and difficult to store under certain atmospheric conditions. The heat sensitive transfer sheets have required additional and often expensive equipment for locally heating an image, which naturally decreases the convenience of use.

The pressure sensitive transfer sheets have tended to be more successful, but have also presented construction problems. For example, a common method of printing of forming the image on the transfer sheet is by a silk screen process. However, most inks will not adhere to transfer sheets having polyethylene or polyester surfaces. Thus, it has been necessary to heat treat these surfaces by flame, vapor deposition, or silicone coating. The ink must then be applied in a manner which creates a relatively thick and heavy deposit in order to provide a mechanically strong, stable, and coherent film upon drying.

Also, the adhesive must have a sufficient tackiness to attach the image to the receiving surface. The final result of this form of transfer sheet very often is a hard and brittle image which does not easily or uniformly separate from the transfer sheet.

Accordingly, an object of this invention is to provide a new and improved means for and process of transferring images from a base sheet to a receiving surface. A more particular object is to provide a decalcomania with a pressure sensitive adhesive, which decalcomania can be produced and used in a more efficient and yet less expensive way than has been done heretofore.

Yet another object is to provide a decalcomania which can be used to transfer images to receiving surfaces of all shape and textures.

In keeping with one aspect of this invention, a decalcomanis image transfer system uses ink or lacquer images formed on base or backing sheets, by commonly-used methods. Preferably, the base sheets are made from a plastic which is not attacked by the ink or lacquer forming the image; for example, these sheets may be a natural styrene or the like. The ink or lacquer images are preferably applied through a silk screen made by a photographic process. The lacquer is allowed to dry and form a weak mechanical bond with the base sheet resulting entirely from the evaporation of the lacquer solvent. A pressure sensitive adhesive is then applied through a similar silk screen, to cover the image of the base sheet. The surface of the adhesive dries and forms a skin-like oxide coating over the external surface of the image. This coating prevents tackiness and an unintended adherance of the decalcomania image to other surfaces, especially during storage. When the reverse side of the base sheet is burnished, the oxidized skin is broken to expose the underlying adhesive, and the image adheres to a receiving surface.

Hence, the images may be easily and neatly transferred, simply by placing the decalcomania base sheet over a receiving surface and by applying a localized burnishing pressure, as with a stylus.

The above-mentioned and other objects and features of this invention and the manner of obtaining them will become more apparent by reference to the following description of an embodiment of the invention taken in conjunction with the accompanying drawings, in which.

Figure 6:
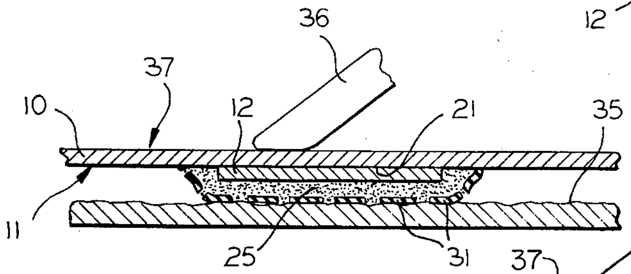
Figure 6A:
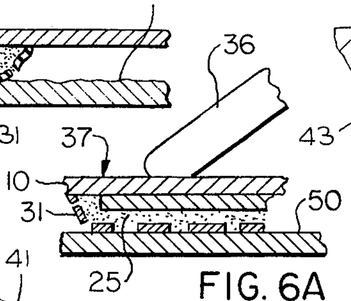
Figure 7:
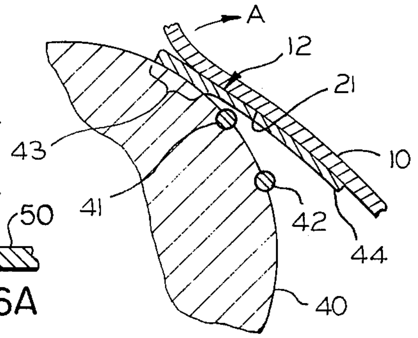
Figure 8:
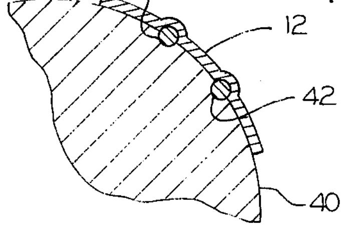

FIG. 6 schematically shows how the oxidation layer breaks under burnishing pressure and the underlying adhesive attaches the image to a receiving sheet or surface;

FIG. 6A schematically illustrates pre-release and shows how the oxidation layer breaks under burnishing pressure and the underlying adhesive does not attach itself to a specially treated release surface; and FIGS. 7 and 8 show how the image may be attached to unusual receiving surfaces.

Figure 1:
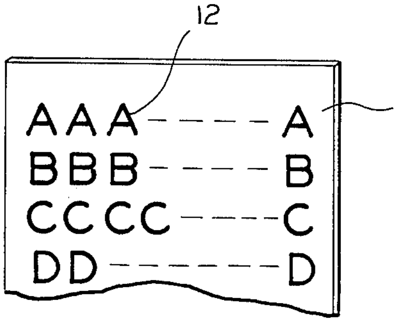
FIG. 1 is a fragmentary view of a decalcomania image transfer system comprising a base sheet and images.

As shown in FIG. 1, a decalcomania system, constructed in accordance with this invention, comprises a base sheet 10 and one or more transfer images (such as letters) 12, fixed to one surface 11 of the base sheet 10. Any of various types of materials are suitable for use as the base sheet 10, such as a linear oriented polystyrene extruded sheet, for example.

The characteristics of the base sheet 10 used by the inventive system includes a brittle and non-stretching material, since an object is to prevent the kind of image distortion which occurs when the base sheet must stretch under burnishing pressure in order to release the image. The surface of the base sheet should be very smooth so that there are few, if any, surface irregularities or non-uniformatives which would enable air to leak under the image. Also, the base sheet should have chemical properties which do not react to the chemicals of the ink or lacquer used to make the image.

A styrene sheet has these properties. Also, it is relatively translucent so that a person using the inventive transfer system may accurately align the image over the receiving surface. When transfer is desired, the styrene base sheet also releases the images more readily. The preferred styrene base sheet 10 is about .0045 millimeters thick and has a matte finish.

The images 12 are applied to one surface 11 of the base sheet 10. By way of example, FIG. 1 shows these images 12 to be letters. However, any number, punctuation, design or decoration can be transferred equally as well. These images are composed of a flexible decal lacquer 14 containing a pigmented organic resin. At the present, the DLW series decal lacquer manufactured by the Advance Process Company of Chicago, Illinois has been found particularly effective.

The images may be applied to the base sheet by any of the commonly-used methods. For example, a rotogravure press might be used. However, a preferred method applies the lacquer to surface 11 (see FIG. 2) through a silk screen stencil 15 comprised of an exposed photo emulsion affixed to a suitable mesh 16, such as one having approximately 325 threads per linear inch with openings in about 36% of that area.

Figure 3:
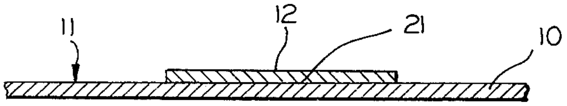
FIG. 3 is a cross-sectional view of the base sheet, with the deposited image thereon.

The method of making the silk screen is well known to those skilled in the art. First, a mesh 16 is selected and coated with a photo-resist which may be purchased from the Eastman Kodak Company of Rochester, N.Y. Next, a mask, in the form of the desired images 12, is placed over the photo-resist and exposed to light, which converts the photo-resist into an insoluble form. Then, the silk screen mesh is placed in an appropriate bath to wash away the non-exposed and still soluble photo-resist. This leaaves a screen of mesh 16 wherein some areas 20 are open and other areas 15 are covered by the now insoluble photo-resist. If this silk screen is placed over the base sheet 10, ink or decalcomania lacquer 14 may be squeegeed through the open mesh 14 which is not covered by the insoluble photo-resist 15. When the silk screen is lifted away, the image 12 of the open screen area remains (FIG. 3) on the base sheet. The lacquer image must be thick enough to have the mechanical strength required to survive the transfer process.

The ink or lacquer 14 does not react chemically or otherwise penetrate the base sheet 10. Hence, the resulting structure of FIG. 3 comprises two completely separate layers 10, 12 clinging together, primarily because there is no air at the interface surface 21 between them. For convenience of expression, the term "intimate contact" is used in the appended claims to describe this characteristic wherein the ink or lacquer is laid down on the surface of the paper with virtually no air at the interface between the lacquer and the paper surface. Also, the properties of the materials of layers 10, 12 are such that they naturally cling to each other.

Accordingly, the invention is unlike prior art transfer sheets wherein the ink chemically bonds with the base sheet 10. The opposite result is accomplished with the present invention. When the decal ink or lacquer initially adheres to the styrene base sheet 10, it is simply because of wetness. As the lacquer dries, the solvent in the lacquer evaporates, a dry layer forms and tends to create a mechanical bond at the interface 21. The image thus formed has the advantages of requiring less ink or lacquer per image, of more easily separating from the base sheet, and of remaining more flexible after drying. This flexibility is particularly significant when the image is transferred to curved, textured, or non-rigid surfaces, a feature previously unavailable without great difficulty.

Figure 2:
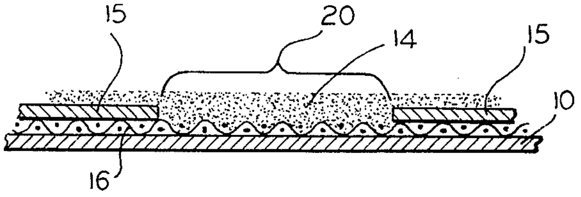
FIG. 2 is a schematical cross-sectional view of a silk screen stencil, being used to deposit an image on a base sheet.
Figure 4:
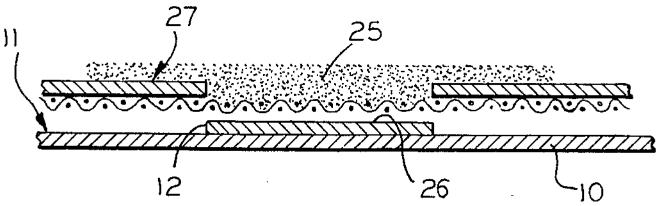
FIG. 4 is a cross-sectional view of a silk screen stencil being used to deposit an adhesive layer on the structure of FIG. 3.
Figure 5:
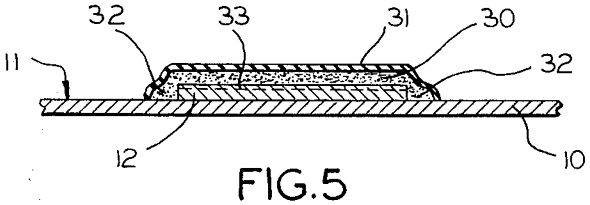
FIG. 5 is a cross-sectional view of the structure produced by the process of FIG. 4 with a skin-like layer formed over the adhesive by oxidation.

A pressure sensitive adhesive 25 is applied over the exposed surface 26 (i.e., the surface opposite interface 21) of the image 12. In greater detail, another silk screen 27 (FIG. 4) is prepared in essentially the same manner as the silk screen 15, 16 of FIG. 2 is prepared. This silk screen preferably has a mesh of about 305 threads per linear inch and an open area equal to about 35% of the total mesh area. Then, the screen 27 is aligned with the images deposited on base sheet 10 during the step of FIG. 2. Next, a pressure sensitive adhesive 25 (in liquid form) is squeegeed through the open silk screen mesh and deposited in a layer 30 extending over the images. As the adhesive dries, a thin oxidation film 31 forms over it to prevent a tackiness which might otherwise cause the decalcomania to stick to things generally, and to other and similar decalcomania sheets specifically.

The pressure sensitive adhesive generally used in industry has these peculiar properties: sufficient tackiness to readily attach itself to the final surface, sufficient plasticizer content to form a strong and uniform film on the surface, and resistant to breaking away from itself. However, the inventive structure adhesive should have a very low surface tackiness, with a readily oxidizable outer surface, no strong film formers, and should readily break away from itself. Hence, these adhesive properties of the inventive structure are opposite to the normally desirable pressure sensitive adhesive properties. Therefore, the invention uses those very properties, which are commonly found unacceptable in the normally used pressure sensitive adhesives.

The adhesive material 25 contains an epoxy resin and a solvent common to both the lacquer images 12 and the styrene base sheet 10. A particularly effective adhesive for these purposes is Industrial Adhesive Number 96442, manufactured by Spartan Adhesives, Crystal Lake, Illinois. This adhesive is a rubber-based substance with a solvent system which evaporates at an extremely high rate as compared with the other and similar adhesives to thereby form a dry oxidized layer which is not tacky but which perserves a tackiness in the adhesive underlying the oxidized layer. The solvent in this adhesive 25 chemically reacts with the sytrene base sheet 10 and may form a moderately weak chemical bond around a thin edge periphery 32 of the image. The adhesive 25 also softens a thin outer layer 33 of the lacquer image 12 and forms a relatively strong chemical bond with it.

In accordance with this invention, the method of transferring images is exceedingly simple. In reference to FIGS. 3, 6, the surface 11 of the decalcomania is placed in aligned contact with a receiving surface 35, preparatory to a transfer of the image 12 thereto. The receiving surface 35 may have any suitable surface. To emphasize this fact, FIG. 6 has been drawn to show a very rough surface 35, which would be most difficult to use with previously known transfer systems.

The image 12 is then aligned into final position, over exactly the desired site on the receiving surface. This alignment is easily accomplished due to the translucent nature of the styrene base sheet 10.

Next, a blunt burnishing instrument 36 is used to burnish the surface 37 of the decalcomania in the area immediately over the image 12 to be transferred to receiving surface 35. When pressure is thus applied to the decalcomania, the oxidized coating 31 of the adhesive is broken at many points under the burnished area and the still tacky underlying adhesive 25 adheres to the receiving surface 35. The base sheet 10 may then be lifted away from the receiving surface 35. Since the chemical bond between the adhesive 25 and the lacquer image 12 is much stronger than the primary mechanical bond between the image 12 and the base sheet 10, a separation occurs at the interface 21 and the transfer of the image 12 to the surface 35 is neatly and easily completed.

One characteristic of the invention not usually found in previous transfer systems relates to the manner in which the image may be applied to uneven surfaces. To illustrate this feature, FIGS. 7 and 8 have been drawn in a fanciful manner, to represent such an unusual surface contour. For example, there is a large diameter spherical surface 40 having partially embedded therein two small diameter surfaces 41 and 42. This is merely a graphical representation having no special significance; however, it might be thought of as the cross-section of a stitched seam on a baseball.

The prior art has tended to rely upon a stretching of a base sheet (such as 10) to release the image responsive to a burnishing. If such a sheet were stretched over the surfaces 40–42 of FIGS. 7, 8, the image would probably be released prematurely, be damaged or be ruined. However, these problems do not occur with the inventive system because the bond at the interface 21 is much weaker than the bond used in other systems and the adhesive 25 has a much greater holding power than usual.

According to the invention, the base sheet 10 is placed in proper alignment over receiving surface 40. Then, the image 12 is burnished, but only along one edge 43. The opposite edge 44 of the image 12 is free from any attachment with the surface 40. Next, the base sheet 10 is peeled (in direction A) away from the burnished edge 43. The bond in area 43 is so strong and the bond at the image-base sheet interface 21 is so weak that the image may be peeled off the base sheet without having to be stuck to the release surface. Of course, care must be taken not to pull too hard or at an odd angle which might destroy the image.

As the image 12 is freed from the base sheet 10, gravity naturally causes it to fall down, spread out upon the surface 40. With a little care, the image 12 may not be pressed gently over the receiving surfaces 40–42 to shape it to the surface contours, in a smooth and unbroken manner. As the image 12 begins to adhere to these receiving surfaces, progressively more pressure may be applied to rupture the oxidized adhesive surface film 31 and to bring the image 12 into a close, contour following contact with the receiving surfaces 40-42. With only a slight amount of practice, it is possible to quickly master the skill required to complete this type of transfer.

The inventive transfer system offers a pre-release advantage (FIG. 6A) not generally found in other transfer systems. FIG. 6A is identical to FIG. 6 except that, unlike receiving surface 35, the sheet 50 has a release coating (such as silicone) so that the adhesive 25 cannot adhere thereto. Usually a plurality of the decalcomania transfer sheets are packed and stored, interleaved with backing papers 50 treated with silicone, which will not stick to the adhesive 25. Thus, the image 12 may be pre-released by burnishing it against the backing paper 50. Since it will not stick to the backing paper, the image 12 is released from the base sheet 10, but it continues to cling thereto. Hence, the image may thereafter be released by finger pressure applied over sheet 10 while it is resting over the receiving surface.

This pre-release offers a wide range of possible uses, not heretofore available. For example, a pre-released image could be held against a small diameter cylinder, such as a pencil, and pressed on by finger pressure. When the base sheet is peeled away, the image will fall over and drape around the cylinder. This way it would be very easy to place a company logo on a give-away item, for example. Of course, there are many other examples of situations where pre-release serves needs not normally served by other forms of decalcomanias.

Although only one embodiment of the invention has been described and illustrated, it should be clear that modifications may be made by those having only the skill of the art. Therefore, the appended claims are to be construed to cover all equivalents which do not depart from the spirit and scope of this invention.

I claim:

1. A system for transferring decalcomania images to a receiving surface, which system comprises: a non-stretching styrene base sheet having a smooth surface free of irregularities; at least one image formed of ink or lacquer deposited on and in intimate contact with surface of said base sheet and composed of a flexible decal ink or lacquer which does not chemically react with said base sheet, said smooth base sheet surface precluding leakage of air into the interface area between said image and said base sheet surface owing to intimate contact, whereby said image clings to said base sheet primarily because there is no air at the surface between the image and base sheet when said ink or lacquer is dry, and a pressure sensitive adhesive, said adhesive having a readily oxidizable outer surface film, said adhesive further extending over and bonding to a thin outer layer of the exposed surface of said image without penetrating through the image while said oxide protects the adhesive underlying said surface film from drying so that the bond between said adhesive and said image is stronger than the bond primarily caused by an absence of air space at the interface between said image and said base sheet.

2. The system of claim 1 wherein said base sheet is a linear oriented styrene, in the order of 0.0045 millimeters thick.

3. The system of claim 1 wherein said image contains a pigmented organic resin.

4. The system of claim 1 wherein said adhesive includes an epoxy resin having a solvent which is a solvent for both the lacquer of said image and the styrene said base sheet.

5. The system of claim 1 wherein said image is an image which is formed through a silk screen mesh of about 325 threads per linear inch with an open area between the threads equal to about 36% of the area of the mesh.

6. The system of claim 5 wherein said adhesive is formed on the image through a silk screen of a mesh of about 305 threads per linear inch with an open area between the threads equal to about 35% of the area of the mesh.

7. The system of claim 1 and a release sheet of material which will not adhere to said adhesive when said image is burnished while it is being held against said release sheet whereby said image continues to cling to said base sheet when said base sheet is burnished to pre-release said image while said decalcomania is held against the surface of said release sheet.

8. The system of claim 7 wherein said treated surface is treated with silicone.

9. The system of claim 7 wherein said pre-released image may thereafter be transferred to a receiving surface responsive to light finger pressure.

* * * * *